United States Patent [19]

Louks

[11] Patent Number: 5,006,368

[45] Date of Patent: Apr. 9, 1991

[54] PLASTIC PARTICLE COATED WITH PROCESSING AID AND METHOD OF COATING

[75] Inventor: Paul T. Louks, Saginaw, Mich.

[73] Assignee: The Dow Chemical Company, Midland, Mich.

[21] Appl. No.: 511,479

[22] Filed: Apr. 18, 1990

Related U.S. Application Data

[63] Continuation-in-part of Ser. No. 259,937, Oct. 19, 1988.

[51] Int. Cl.$^5$ .......................... B05D 3/02; B05D 7/00
[52] U.S. Cl. .................................... 427/189; 427/213; 427/222
[58] Field of Search ............... 427/222, 213, 189, 214, 427/215; 264/130, 134

[56] References Cited

U.S. PATENT DOCUMENTS

| | | | |
|---|---|---|---|
| 2,839,422 | 6/1958 | Beyer et al. | 427/222 |
| 3,687,717 | 8/1972 | Philip | 427/222 |
| 4,238,570 | 12/1980 | Shibata et al. | 521/57 |
| 4,483,886 | 11/1984 | Kowalski | 427/222 |
| 4,915,987 | 4/1990 | Nara et al. | 427/222 |
| 4,935,246 | 6/1990 | Ahrens | 427/213 |

*Primary Examiner*—Shrive Beck

[57] ABSTRACT

Plastic particles showing improved behavior upon extrusion, comprising coating the particles with a fused layer of certain waxes or polymeric materials; and a method of preparation, comprising heating the plastic particles to a temperature just below the softening or fusing temperature of the additive while blending the particle in a high intensity blender, introducing the additive and maintaining intense blending until the temperature is above the fusing temperature of the additive, and discharging the coated particles from the blender.

17 Claims, No Drawings

5,006,368

PLASTIC PARTICLE COATED WITH PROCESSING AID AND METHOD OF COATING

CROSS-REFERENCE TO RELATED APPLICATION

This Application is a continuation-in-part of the co-pending application Ser. No. 259,937, filed Oct. 19, 1988.

FIELD OF THE INVENTION

The present invention relates to particles of a plastic having improved extrusion properties.

BACKGROUND OF THE INVENTION

It is well-known to form a variety of articles fabricated from plastic pellets. In the past, the practice generally was to extrude the plastic directly from the powder form in which it is recovered after polymerization. Because of the convenience of shipping and handling, it is desirable to form the plastic into pellets prior to final extrusion.

With the increased demand for pellets, the processing conditions to which pellets are exposed has become more demanding. When melt processed, conventional plastic pellets have a tendency to generate particulate degradation products (i.e., carbonaceous material, gels or fish eyes) in the extrudate, particularly when the plastic is exposed to relatively long residence times in the melt processing equipment.

Processing aids are conventionally blended into the plastic prior to fabrication into a pellet. However, it has been found that a certain lag time period exists, after exposure to desirable processing temperatures, before the blended processing aids function effectively. It is during the lag time period, that the plastic is particularly susceptible to decomposition upon exposure to desirable processing temperatures.

In some instances, plastic pellets have had processing aids applied to their surfaces. Generally, such processing aids are applied by spraying droplets of processing aid on the pellet surface. While such techniques have had some success, these techniques do not consistently provide uniform pellet surface coating.

Although conventionally coated pellets may be satisfactorily extrudable for a period, such pellets have not been found to be easily extrudable for commercially required periods. Specifically, when extruded, the non-uniform coating on the pellet surface causes variations in extrusion rate, torque within the extruder and pressure within the extruder. Moreover, the non-fused coatings tend to flake off the pellet surface.

It is desirable to produce a plastic pellet, having its surface coated with lubricant, which is capable of being extruded without causing variations in torque of the extruder screw, melt pressure or rate of extrusion of the pellet. It is to these goals that the present invention is directed.

SUMMARY OF THE INVENTION

The present invention concerns a process for preparing a particle having improved extrudability, which process comprises the steps of: (a) providing a plastic in particle form, and a processing aid having a softening point between ambient temperatures and below the processing temperature of the plastic in particle form: (b) charging the particle into a high intensity blender, said blender having an impeller: (c) rotating the blender impeller at a speed and for a period of time effective to raise the temperature of the particle surface to between about 5° C. and 10° C. below the softening point of the processing aid; (d) charging the processing aid into the blender such that the processing aid contacts the heated particle surface; and (e) rotating the blender impeller at a speed and for a period of time effective to raise the temperature of the particle surface to a temperature above the softening point of the processing aid, and to coat a portion of the particle surface by fusing the processing aid thereto.

Additionally, the present invention concerns a composition, in the form of an extrudable particle, which comprises a plastic, said particle having a processing aid fused on the surface thereof at a level effective to improve the extrudability of the particle.

DETAILED DESCRIPTION OF THE INVENTION

Applicant has discovered that the process and composition according to the present invention improves the extrudability of the plastic particles. The particles are considered to possess improved extrudability, i.e., less carbonaceous material contamination on the melt processing equipment, e.g., on an extruder screw heel: and a lower mechanical energy to extrude than a particle, which does not have processing aids coated on its surface in a manner according to the present invention.

The plastics may be powdered, but is preferably pelletized.

Exemplary of suitable polymers are the olefin polymers such as homopolymers and copolymers of $\alpha$-monoolefins (e.g., ethylene, propylene, butene-1, isobutylene, 1-pentene, 1-hexene, 1-octene, and the like); and $\alpha$-monoolefin/$\alpha$-monoolefin copolymers (e.g., ethylene/propylene copolymers). Additional suitable polymers include those based on substituted $\alpha$-monoolefins (e.g., $\alpha$-monoolefins having from 4 to 12 carbon atoms wherein the substituents can be halo, alkyl or haloalkyl having from 1 to 12 carbon atoms: $\alpha$-alkenyl having 2 to 12 carbon atoms; acyl having 1 to 12 carbon atoms: carboxylate having from 1 to 12 carbon atoms: alkoxyl having from 1 to 12 carbon atoms; and aryloxy having from 6 to 12 carbon atoms). Exemplary substituted $\alpha$-monoolefins are vinyl chloride, vinyl bromide, vinylidene chloride, acrylic acid, methacrylic acid, ethyl acrylate, n-butyl acrylate, i-butyl acrylate, diethyl acrylate, diethyl maleate, ethyl hydrogen maleate, methyl ethacrylate, dibutyl itaconate, vinyl acetate, vinyl propionate, vinyl benzoate, vinyl ethyl ether, methyl vinyl ketone, acrylamide, acrylonitrile and the like.

Other suitable polymers include those based on carboxylic acids having from 3 to 8 carbon atoms (e.g., ethylene vinyl acetate and ethylene acrylic acid), and partially hydrolyzed copolymers thereof (e.g., ethylene vinyl alcohol); alkyl or haloalkyl esters of carboxylic acid wherein the alkyl or haloalkyl has from 1 to 12 carbon atoms; $\alpha$-alkenyls having 2 to 12 carbon atoms; acyls having 1 to 12 carbon atoms: carboxylates having from 1 to 12 carbon atoms; alkoxyls having from 1 to 12 carbon atoms; aryloxys having from 6 to 12 carbon atoms: rubbery ethylene-propylene-diene terpolymers: polyesters and copolyesters such as those polyesters and copolyesters whose synthesis employs at least one polyhydric alcohol and at least one dibasic acid (e.g., polyethylene terephthalate, and the like): the polyetheramides, and the like; the polyamides (e.g., polycaprolactam, and the like); the polycarbonates (e.g., bisphenol A, and the like); the polyester carbonates; the polyimides; the vinyl aromatics such as styrene; and polymers based on vinyl aromatics copolymerized with suitable monomers, including unsaturated nitriles (e.g., acrylonitrile, methacrylonitrile, ethacrylonitrile, and the like), and the conjugated 1,3-dienes (e.g., butadiene, isoprene, and the like).

This invention is advantageous for those plastics which are commonly melt processed with processing aids, and most advantageous for the extrusion of thermally sensitive plastics which are melt processed with processing aids. For the purposes of this invention, it is understood that the term "thermally sensitive" refers to any plastic which exhibits an undesirable change in properties, particularly physical properties, upon exposure to desirable processing temperatures. Exemplary thermally sensitive plastics include polyvinylidene halide copolymers, polyvinyl halide copolymers and ethylene vinyl alcohol copolymers.

The plastic polymer is highly preferably a copolymer containing a major portion of vinylidene chloride and a minor portion of an ethylenically-unsaturated comonomer that is suitable for forming a semicrystalline barrier polymer. Many suitable ethylenically-unsaturated comonomers are known, such as vinyl chloride, alkyl acrylates, alkyl methacrylates, acrylic acid, methacrylic acid, itaconic acid and aryl acrylates and methacrylates. The important factor is that the ethylenically-unsaturated comonomer must be chosen and used in proportions such that the resulting copolymer is extrudable and retains a semi-crystalline character. By "semi-crystalline character" it is meant that the copolymer has between about 5 percent and about 95 percent crystallinity. Crystallinity values depend upon the measuring technique, and as used herein crystallinity is defined by the commonly used density method. See, for example, the discussion by R. A. Wessling, in Chapter 6 of *Polyvinylidene Chloride*, Vol. 5, Gordon and Breach Science Publishers, New York, 1977, the teachings of which are incorporated herein by reference.

The ethylenically-unsaturated comonomer is preferably vinyl chloride or an alkyl acrylate. The alkyl acrylates are generally selected to have from about 1 to about 8 carbon atoms per alkyl group. Preferably, alkyl acrylates are selected to have from about 1 to about 4 carbon atoms per alkyl group. The alkyl acrylate is more preferably ethyl or methyl acrylate and most preferably methyl acrylate.

When the ethylenically-unsaturated comonomer is vinyl chloride, then it preferably makes up at least about 10 percent and more preferably at least about 12 percent of the copolymer; it is preferably at most about 20 percent and more preferably at most about 17 percent of the copolymer. When the ethylenically-unsaturated comonomer is methyl acrylate, then it preferably makes up at least about 4 percent and most preferably at least about 5 percent of the resulting copolymer: it is preferably at most about 9 percent and more preferably at most about 7 percent of the resulting copolymer. The vinylidene chloride copolymer is most preferably a 6 percent methyl acrylate copolymer. The remainder of the copolymer in each case preferably consists essentially of vinylidene chloride. Of course, the vinylidene chloride copolymer may also contain small amounts (usually less than about 1 to 2 percent) of other ethylenically-unsaturated comonomers which do not substantially reduce the extrudability or increase the permeability of the copolymer.

Vinylidene chloride copolymers are known and are commercially available. Methods to synthesize them, such as by an emulsion or suspension polymerization process, are also familiar to persons of ordinary skill in the art. The copolymers and processes to synthesize them are described in U.S. Pat. Nos. 2,558,728; 3,007,903; 3,642,743; and 3,879,359; in R. A. Wessling, *Polyvinylidene Chloride*, supra, at 21-33 and 44-53; in 23 Kirk-Othmer Ency. Chem. Tech., supra, at 783-87; and in Yen et al., *Barrier Resins*, Report No. 179 of SRI International Process Economics Program 55-106 (February, 1986); all of which are incorporated herein by reference.

The plastic polymer may contain suitable additives, such as colorants, pigments, non-elastomeric reinforcing agents, fillers, antioxidants, stabilizers, etc., as long as these do not detrimentally affect the resulting uniformity of coating and completeness of surface coverage. Commonly used additives are described in numerous sources, such as R. A. Wessling, *Polyvinylidene Chloride* at 174-76, and Johnson, *Process for Imparting Stability to Particulate Vinylidene Chloride Polymer Resins*, U.S. Pat. No. 4,418,168 (Nov. 29, 1983), which are incorporated herein by reference.

The plastic particle may be in the form of a powder, or in the form of a pellet.

If the plastic particles are a powder, then the average particle diameter of the powder is preferably at least about 50 μm, more preferably at least about 100 μm, and most preferably at least about 180 μm; and is preferably at most about 762 μm (1/32 inch), more preferably at most about 500 μm, and most preferably at most about 350 μm. Of course, the application of a coating may change the particle dimensions.

Methods of forming the plastic into pellets are well-known to those skilled in the art. Any method capable of forming the plastic into pellets is suitable for use in the present invention. For the purposes of this application, the terms "pellet" or "pellets" refer to particles having a minimum cross-sectional dimension of at least 1/32 inch, preferably at least 1/16 inch and most preferably at least ⅛ inch, said pellets suitably have a maximum cross-sectional dimension of at least ½ inch, preferably at least ⅜ inch and most preferably at least ¼ inch. Exemplary of a method suitable for use in forming the pellets of the mixture is extrusion through a strand die and pelletization by chopping the extruded strand into pellets.

By "processing aid" is meant any component which is employed to improve extrusion performance. Although not intended to be bound by theory, it is believed that by applying the processing aid to the surface of the particle the processing aid will, during melt processing, rapidly migrate to the metal surface of the melt processing equipment. Surface coated processing aids thereby provide relatively fast functioning compared to conventionally compounded processing aids, which require particle melting prior to functioning. Consequently, a lower amount of the processing aid is necessary to achieve equivalent effects to the same processing aid blended with the plastic.

Generally, the surface of the particle will be coated with a processing aid, wherein the processing aid will be in an amount of between about 0.001 weight percent to about 2 weight percent, said weight percents based on the weight of the particle: preferably in an amount of between about 0.01 weight percent to about 1.5 percent, said weight percents based on the weight of the particle; and most preferably in an amount of between about 0.1 weight percent to about 0.7 weight percent, said weight percents based on the weight of the particle. Generally, within the suitable ranges, the higher the level of processing aid on the particle surface, the more benefit one will see in terms of improving extrudability of the plastic particle.

Within the prescribed ranges, the choice of optimum amounts of processing aids will be dependent upon the the processing aid selected, the viscosity of the processing aid, the size of the particle and the type and size of the equipment through which the particle is extruded.

Generally within the prescribed weight percentage ranges for coating processing aids on the particle surface, the inventor has found that the more processing aid which is coated on the particle surface the more of a decrease in particulate degradation will be seen in the extrudate. Preferably, the particle surface will be uniformly coated with the processing aid, that is to say, when compared to an uncoated particle, 50 percent coverage of a particle surface will produce somewhat decreased particulate degradation of the extrudate: whereas 90 percent coverage of the same particle will produce a still further improvement in decreasing the particulate degradation in the extrudate. Similarly, within the ranges discussed above, the thicker the surface coating, the more benefit one will see in terms of decreasing the particulate degradation in the extrudate. If, however, the processing aid is applied in quantities excessive for the processing aid selected, the viscosity of the processing aid, the size of the particle and the type and size of the equipment through which the particle is extruded, the feeding of the particle into the melt processing equipment may be impaired because of insufficient friction in the feed zone; or the excess amount of processing aid may form globules on the particle surface.

The processing aids coated on the particle surface are those generally used for the conventional melt processing of plastics in either powder or pellet form. The processing aid is selected to have a softening point between ambient temperatures and below the processing temperature of the plastic in particle form. Preferably, the processing aid should have, within the preferred range, a softening point slightly above ambient temperatures to allow for rapid functioning and yet for easy handling, e.g., low particle surface tackiness. Within the above parameters, the specific processing aid selected will be a matter of choice for the skilled artisan, depending upon the desired results.

Exemplary processing aids include lubricants and olefin polymers. The choice of specific processing aids for specific plastics will be a matter of choice well within the means of one skilled in the art. Exemplary factors in selecting a processing aid, although not all factors are important for all polymers, include melt adhesion, fusion delay, viscosity reduction and an extrusion rate increase at a given rpm.

Lubricants include both internal and external lubricants which improve extrusion performance of the plastic. By "internal lubricant" is meant any of the classes of compounds that have heretofore been employed as internal lubricants in plastics. Although not intended to be bound by theory, the lubricants are classified as "internal" because they increase the ease with which the polymer molecules slip past one another, resulting in reduced melt viscosity, better flow, and lower energy to extrude requirements for melt processing. The compositions may perform functions in addition to that mechanism referred to as internal lubrication.

By "external lubricant" is meant any of the class of compounds that have heretofore been employed as external lubricants in plastics. Although not intended to be bound by theory, the lubricants are classified as "external" because they are believed to be at least partially incompatible with the molten polymer. The lubricant will therefore migrate to the surface of the molten polymer and form a film between the polymer and the heated metal surface of the extruder, mill or other equipment used to process the polymer composition. This film significantly reduces the tendency of the polymer to adhere to these metal surfaces and degrade. The compositions may perform functions in addition to that mechanism referred to as external lubrication.

Exemplary lubricants include fatty acids (e.g., stearic acid); esters (e.g., fatty esters, wax esters, glycerol esters, glycol esters, fatty alcohol esters, and the like); fatty alcohols (e.g., n-stearyl alcohol): fatty amides (e.g., N,N'-ethylene bis stearamide); metallic salts of fatty acids (e.g., calcium stearate, zinc stearate, magnesium stearate, aluminum stearate, sodium stearate, tin stearate, sodium lauryl sulfate, and the like): and polyolefin waxes (e.g., paraffinic, nonoxidized and oxidized polyethylene and the like).

The term "olefin polymer" includes homopolymers and copolymers of α-monoolefins and substituted α-monoolefins, particularly α-monoolefins or substituted α-monoolefins having from 4 to 12 carbon atoms. Exemplary α-monoolefin polymers include polyethylene (e.g., ultra-low density polyethylene, low density polyethylene, linear low density polyethylene, medium density polyethylene, high density polyethylene): polypropylene; poly(butene-1), poly(isobutylene); poly(1-pentene): poly(1-hexene) and poly(1-octene).

Substituted α-monoolefins include those wherein the substituents can be halo, alkyl or haloalkyl having from 1 to 12 carbon atoms: carboxylic acid having from 3 to 8 carbon atoms: alkyl or haloalkyl ester of carboxylic acid wherein alkyl or haloalkyl has from 1 to 12 carbon atoms; u-alkenyl having 2 to 12 carbon atoms; acyl having 1 to 12 carbon atoms; carboxylate having from 1 to 12 carbon atoms; alkoxyl having from 1 to 12 carbon atoms;' and aryloxy having from 6 to 12 carbon atoms.

The α-monoolefins and substituted α-monoolefins may also be copolymerized with a variety of suitable comonomers such as carboxylic acids having from 3 to 8 carbon atoms (e.g., ethylene vinyl acetate, and ethylene acrylic acid); alkyl or haloalkyl esters of carboxylic acid wherein alkyl or haloalkyl has from 1 to 12 carbon atoms; α-alkenyls having 2 to 12 carbon atoms; acyls having 1 to 12 carbon atoms: carboxylates having from 1 to 12 carbon atoms; alkoxyls having from 1 to 12 carbon atoms; aryloxys having from 6 to 12 carbon atoms; and α-monoolefin/α-monoolefin copolymers (e.g., ethylene/propylene copolymers).

When the plastic polymer is a vinylidene chloride copolymer, then exapmles of useful processing aids may also include inorganic stabilizers, such as tetrasodium pyrophosphate (TSPP), magnesium hydroxide $(Mg(OH)_2)$, magnesium oxide, calcium hydroxide, and potassium pyrophosphate or an equivalent thereof; high density polyethylene: and/or paraffin or polyethylene wax.

Such additives are known and/or available from the following sources:

(a) inorganic stabilizers and their synthesis are described in Johnson, *Process for Imparting Stability to Particulate Vinylidene Chloride Polymer Resins*, U.S. Pat. No. 4,418,168 (Nov. 29, 1983) and *The Merck Index*, 10th Edition, (1983), which are incorporated herein by reference. The most preferred stabilizer is tetrasodium pyrophosphate. Its concentration is preferably no more than 1.1 part per 100 parts of copolymer, by weight. It preferably has an average particle size of 1 to 50 microns:

(b) high density polyethylene, its properties and its synthesis are described in 16 Kirk-Othmer T Ency. Chem. Tech.—3rd Ed., *Linear (High Density) Polyethylene* and *Olefin Polymers (Ziegler Polyethylene)*, at 421-51 (J. Wiley & Sons 1980), which is incorporated herein by reference. Its concentration is preferably no more than 1.1 part per 100 parts of copolymer, by weight.

(c) Oxidized polyolefins preferably have an acid number of about 10 to 35, a softening point of about 85° C. to 145° C. as determined by ASTM E-28, a number average molecular weight of about 1000 to about 5000 as determined by vapor phase osmometry, and a Brookfield viscosity at 140° C. of about 120 to 300 centipoise (cps). Oxidized polyethylene and oxidized polypropylene are known polymers which are commercially available, for instance under the trademark Allied 629A from Allied-Signal Corp. They can be prepared by treating an ethylene homopolymer or copolymer with oxygen or an organic peroxide or hydroperoxide. The processes for synthesizing them are described in 16 Kirk-Othmer Ency. Chem. Tech. —3rd Ed. *Olefin Polymers (High Pressure Polyethylene)*, at 412 (J. Wiley & Sons 1980) and 24 Kirk-Othmer Ency. Chem. Tech.—3rd Ed. *Waxes*, at 477 (J. Wiley & Sons 1980), which are incorporated herein by reference.

(d) Paraffin waxes are defined herein as having a Brookfield viscosity in the range of about 50 to about 300 cps @ 140° C.: a melting point in the range of about 40° C. to about 80° C.: and a density in the range of about 0.85 g/cm$^3$ to about 0.95 g/cm$^3$. *Polyethylene waxes* are defined herein as having Brookfield viscosity in the range of about 130 to about 450 cps @ 140° C.; a melting point in the range of about 80° C. to about 100° C.: and a density in the range of about 0.85 g/cm$^3$ to about 0.95 g/cm$^3$. Paraffin and polyethylene waxes and their properties and synthesis are described in 24 Kirk-Othmer Ency. Chem. Tech.—3rd Ed., *Waxes*, at 473-77(J. Wiley & Sons 1980), which is incorporated herein by reference. The wax is preferably polyethylene wax.

The processing aid coated on the surface preferably contains at least one organic stabilizer and at least one other processing aid chosen from the group consisting of high density polyethylene, oxidized polyolefin, paraffin wax and other lubricants. The previously-named processing aids are particularly useful when the vinylidene chloride copolymer is an alkyl acrylate copolymer.

When the plastic polymer is a vinylidene chloride-vinyl chloride copolymer in powder form, then the processing aids should contain at least one component which is not stearic acid, particularly when the ratio of vinylidene chloride to vinyl chloride is about 80-20 by weight.

The particles are prepared for coating by being mixed in a high intensity blender. The processing aid is then charged into the blender for further mixing of the preheated particle and processing aid until the processing aid fuses onto the particle surface.

By "high intensity" blender is meant mixers that can apply about 10 horse power per cubic foot of material with high shear rate, with a maximum of 20,000 sec$^{-1}$. Exemplary high intensity blenders include Banbury mixers, Prodex-Henschel mixers, and Welex-Papenmeier mixers. Such blenders typically have an impeller for mixing and applying energy to the batch, and a baffle for directing the motion of the product to the center of the vortex. Such blenders also have a jacket surrounding the mixing bowl so that cooling may be applied.

Generally, the blender impeller is run at a tip speed of between about 2000 feet per minute (fpm) to about 4000 fpm, preferably between about 2500 fpm to about 3000 fpm. The degree of deflection of the blender baffle may be adjusted from about 45° to about 0°, and preferably between about 15° to about 0°, where 0° refers to a radial orientation.

The particle surface will be heated to a temperature of at least about 10° C., preferably about 5° C., below the temperature at which the processing aid will soften and fuse. Persons skilled in the art recognize that mixing times will vary with the blending technique, apparatus and the choice of processing aid.

The particles will be mixed until their surface temperature is above that of the temperature required to soften the processing aid, but below the softening point of the plastic. Water may be passed through a water jacket to maintain control of the heating of the particle surface at a temperature of between the softening point of the processing aid and below the softening point of the plastic.

After being surface coated, the particle then may be melt processed and extruded into any suitable final product. The process of the present invention can be used to form a variety of films or other articles.

As is well-known in the art, the films and articles may be fabricated with conventional coextrusion, e.g., feedblock coextrusion, multimanifold die coextrusion or combinations of the two; injection molding; extrusion molding and lamination techniques. Articles formed therefrom include blown and cast, mono and multilayer, films: rigid and foam sheet; tubes; pipes rods; fibers and various profiles. Lamination techniques are particularly suited to produce multi-ply sheets. As is known in the art, specific laminating techniques include fusion, wet combining or heat reactivation. Fusion comprises bonding self-sustaining lamina together by applications of heat and pressure. Wet combining comprises laminating two or more plies by using a tie coat adhesive, which is applied wet; driving off the liquid and combining, by subsequent pressure laminating, in one continuous process. Heat reactivation comprises combining a precoated film with another film by heating and reactivating the precoat adhesive so that it becomes receptive to bonding after subsequent pressure laminating.

The present invention is illustrated in further detail by the following examples. The examples are for the purposes of illustration only, and are not to be construed as limiting the scope of the present invention. All parts and percentages are by weight unless otherwise specifically noted.

EXAMPLES

TABLE I

| Code | Polymer Components |
|---|---|
| PVdC Pellet | A pellet of a polymeric composition comprising a 96.5% base resin, 1.5% ethylene vinyl acetate, 1.2% tetrasodium pyrophosphate and 0.8% epoxidized soybean oil. The base resin is polymerized from a monomer mixture containing 80 weight percent vinylidene chloride and 20 weight percent vinyl chloride, said resin having a major melting point of 164° C., and a molecular weight of 80,000. |
| L-1 | An oxidized polyethylene commercially available under the trade designation as Allied 629A from Allied Corp. The oxidized polyethylene has a density (ASTM Test D-1505) of 0.93 grams per cubic centimeter @ 20° C., a drop point of 104° C. and a Brookfield Viscosity of 200 cps @ 140° C. |
| L-2 | A polyethylene wax commercially available from Allied Corp. under the trade designation Allied 617A. The polyethylene wax has a density (ASTM Test D-1505) of 0.91 grams per cubic centimeter, a drop point of 102° C. and a Brookfield Viscosity of 180 cps @ 140° C. |
| L-3 | An ethylene/vinyl acetate copolymer having polymerized therein 72 weight percent ethylene and 28 weight percent vinyl acetate, both percentages being based upon copolymer weight. The copolymer has a melt index (ASTM Test D-1238) of 22 to 27 decigrams per minute and a density (ASTM Test D-1238) of 0.98 grams per cubic centimeter. The copolymer is commercially available from DuPont under the trade designation Elvax 3180. |

SAMPLE PREPARATION

The pellets are placed in a high speed blender which is commercially available under the trade designation Welex Model 35 from F. H. Papenmeier K. G. Company. The mixer has a diameter of 35 cm, and a nominal capacity of 1 cubic foot. The baffle of the mixer is adjusted in the radial direction, the impeller is started and the tip speed is adjusted to about 2700 feet per minute (fpm). When the pellet temperature reaches 75° C., various processing aids, coded in Table I, are charged in the mixer in quantities set forth in Table II. The pellets and processing aids are blended for a period of about eight minutes and discharged. The discharged material is cooled to about 65° C., by circulating 20° C. air.

FUSION TESTING

Extrudability is determined by measuring the fusion time of the pellet as it is melt processed. The pellets are placed in the bowl of a Brabender ® torque rheometer. The bowl is maintained at a temperature of 170° C. and the speed of the blades is about 60 rpm.

A sample of coated pellets, weighing 80 grams is charged in the rheometer, and the fusion times are determined. The fusion time for the pellets is 60 seconds, and the maximum torque is 960 meters/gram. A relatively short fusion time will cause degradation and discoloration of the molten polymer, resulting from a prolonged exposure to heat while in the molten state. The maximum torque value, a measure of the mechanical energy necessary to cause fusion, should be from about 1800 to about 2500 meter grams. Higher torque values will result in an excessively high current demand and possibly damage to the extruder motor.

The results are set forth in Table II.

TABLE II

| Example | Pellet Code [1] | Coating [2] Processing Aid | Weight Percent | Fusion Time [3] | Fusion Torque [4] |
|---|---|---|---|---|---|
| 1 | PVdC Pellet | L-1 | 0.33 | >600 | NF |
| 2 | PVdC Pellet | L-1 | 0.06 | >600 | NF |
| 3 | PVdC Pellet | L-2 | 0.33 | >600 | NF |
| 4 | PVdC Pellet | L-2 | 0.3 | — | — |
| 5 | PVdC Pellet | L-3 | 0.33 | 30–40 | 770 |
| 6 | PVdC Pellet | L-3 | 0.3 | 15 | 820 |
| 7 | PVdC Pellet | L-1 L-3 | 0.06 0.3 | 30–40 | 680 |

— = not measured.
[1] Pellet type as set forth in Table I.
[2] Coating = (a) processing aid and (b) amount of processing aid coating on pellet in weight percent.
[3] Fusion Time in sec.
[4] Fusion Torque in sec. "NF" means that no fusion occurs by the time the test is terminated after 600 seconds.

EXAMPLES 8–16

The procedures of Examples 1–7, respectively, are repeated with the following exception: instead of the vinylidene chloride-vinyl chloride copolymer, the pellets are made of a polymeric composition comprising a 96.5 percent base resin, 1.5 percent ethylene vinyl acetate, 1.2 percent tetrasodium pyrophosphate and 0.8 percent epoxidized soybean oil. The base resin is polymerized from a monomer mixture containing 94 weight percent vinylidene chloride and 6 weight percent methyl acrylate, said resin having a major melting point of 164° C., and a molecular weight of 90,000.

The pellets exhibited a relatively long fusion time and low fusion torque.

EXAMPLE 17

The procedures of Example 5, respectively, are repeated with the following exception: Instead of the vinylidene chloride-vinyl chloride copolymer, the pellets are made of a polyvinyl chloride copolymer.

The pellets exhibited a relatively long fusion time and low fusion torque.

EXAMPLE 18

The procedures of Example 5 are repeated with the following exception: instead of the vinylidene chloride-vinyl chloride copolymer, the pellets are made of polyethylene terephthalate copolymer.

The pellets exhibited a relatively long fusion time and low fusion torque.

EXAMPLE 19

The procedures of Example 5 are repeated with the following exceptions: instead of the vinylidene chloride-vinyl chloride copolymer, the pellets are made of polypropylene.

The pellets exhibited a relatively long fusion time and low fusion torque.

EXAMPLE 20

The procedures of Example 5 are repeated with the following exceptions: instead of the vinylidene chloride-vinyl chloride copolymer, the pellets are made of a polystyrene.

The pellets exhibited a relatively long fusion time and low fusion torque.

EXAMPLE 21

The procedures of Example 5 are repeated with the following exceptions: instead of the vinylidene chloride-vinyl chloride copolymer, the pellets are made of a high impact polystyrene.

The pellets exhibited a relatively long fusion time and low fusion torque.

EXAMPLE 22

The procedures of Example 5 are repeated with the following exception: instead of the vinylidene chloride-vinyl chloride copolymer, the pellets are made of polycarbonate.

The pellets exhibited a relatively long fusion time and low fusion torque.

Although the invention has been described in considerable detail, with reference to certain preferred embodiments thereof, it will be understood that variations and modifications can be affected within the spirit and scope of the invention as described above and as defined in the appended claims.

What is claimed is:

1. A process for preparing a particle having improved extrudability, which process comprises the steps of:
   (A) providing a plastic in particle form, and a processing aid having a softening point between ambient temperatures and below the processing temperature of the plastic in particle form:
   (B) charging the particle into a high intensity blender, said blender having an impeller:
   (C) rotating the blender impeller at a speed and for a period of time effective to raise the temperature of the particle surface to between about 5° C. and 10° C. below the softening point of the processing aid;
   (D) charging the processing aid into the blender such that the processing aid contacts the heated particle surface: and (E) rotating the blender impeller at a speed and for a period of time effective to raise the temperature of the particle surface to a temperature above the softening point of the processing aid, and to coat a portion of the particle surface by fusing the processing aid thereto.

2. The process of claim 1 wherein the plastic is in the form of a powder.

3. The process of claim 2 wherein the plastic is a semicrystalline vinylidene chloride copolymer.

4. The process of claim 2 wherein the plastic is a polymer or copolymer containing at least one monomer selected from the class consisting of: vinyl chloride, vinyl bromide, vinylidene chloride, acrylic acid, methacrylic acid, ethyl acrylate, n-butyl acrylate, t-butyl acrylate, diethyl acrylate, diethyl maleate, ethyl hydrogen maleate, methyl ethacrylate, dibutyl itaconate, vinyl acetate, vinyl propionate, vinyl benzoate, vinyl ethyl ether, methyl vinyl ketone, acrylamide and acrylonitrile.

5. The process of claim 4 wherein the processing aid contains at least one element selected from the class consisting of: fatty acids, fatty esters, wax esters, glycerol esters, glycol esters, fatty alcohol esters, fatty alcohols, fatty amides, olefin polymers and polyolefin waxes.

6. The process of claim 5 wherein the average processing aid coated on the particles is in an amount equal to between about 0.001 weight percent and 2 weight percent of the particles.

7. The process of claim 6 wherein the processing aid covers on average at least 50 percent of the particle surfaces after step (E).

8. The process of claim 7 wherein the processing aid covers on average at least 90 percent of the particle surfaces after step (E).

9. The process of claim 3 wherein the processing aid contains at least one element selected from the class consisting of: high density polyolefin, oxidized polyolefin, polyolefin waxes and paraffin waxes.

10. The process of claim 1 wherein the plastic particles are pellets.

11. The process of claim 10 wherein the plastic is a polymer or copolymer containing at least one monomer selected from the class consisting of: vinyl chloride, vinyl bromide, vinylidene chloride, acrylic acid, methacrylic acid, ethyl acrylate, n-butyl acrylate, t-butyl acrylate, diethyl acrylate, diethyl maleate, ethyl hydrogen maleate, methyl ethacrylate, dibutyl itaconate, vinyl acetate, vinyl propionate, vinyl benzoate, vinyl ethyl ether, methyl vinyl ketone, acrylamide and acrylonitrile.

12. The process of claim 11 wherein the processing aid contains at least one element selected from the class consisting of: fatty acids, fatty esters, wax esters, glycerol esters, glycol esters, fatty alcohol esters, fatty alcohols, fatty amides, olefin polymers and polyolefin waxes.

13. The process of claim 12, wherein the average processing aid coated on the pellet surface is in an amount between about 0.001 weight percent and about 2 weight percent, said weights percents based on the total weight of the pellets.

14. The process of claim 13 wherein the processing aid covers average at least about 50 percent of the surface area of the pellets after Step (E).

15. The process of claim 14 wherein the processing aid covers on average at least about 90 percent of the surface area of the pellets after step (E).

16. The process of claim 14 wherein the plastic is a semicrystalline vinylidene chloride copolymer.

17. The process of claim 16 wherein the processing aid contains at least one element selected from the class consisting of: high density polyolefin, oxidized polyolefin, polyolefin waxes and paraffin waxes.

* * * * *